US008272301B2

(12) United States Patent
Huang

(10) Patent No.: US 8,272,301 B2
(45) Date of Patent: Sep. 25, 2012

(54) EXTENSIVE APPARATUS FOR A WRENCH

(75) Inventor: Kwang-Si Huang, Taichung (TW)

(73) Assignee: Taken Etorque Technology Co., Ltd., Taichung (TW)

( * ) Notice: Subject to any disclaimer, the term of this patent is extended or adjusted under 35 U.S.C. 154(b) by 302 days.

(21) Appl. No.: 12/784,495

(22) Filed: May 21, 2010

(65) Prior Publication Data

US 2011/0283845 A1 Nov. 24, 2011

(51) Int. Cl.
*G01L 3/02* (2006.01)
*B25B 23/14* (2006.01)

(52) U.S. Cl. .......................................... 81/479; 73/862.21

(58) Field of Classification Search ............... 73/862.22, 73/862.23, 862.331–862.335, 862.21; 81/479, 81/467, 469, 478, 480–483

See application file for complete search history.

(56) References Cited

U.S. PATENT DOCUMENTS 4,643,030 A * 2/1987 Becker et al. .............. 73/862.23
6,196,071 B1 * 3/2001 Shomo ........................ 73/862.21
6,796,190 B2 * 9/2004 Curry .......................... 73/862.21
7,469,619 B2 * 12/2008 Anjanappa et al. ............. 81/479
7,562,589 B2 * 7/2009 Anjanappa et al. ........ 73/862.23

* cited by examiner

*Primary Examiner* — Robert Pezzuto

(57) ABSTRACT

An extensive apparatus includes a shaft, a sensor, a display, a sleeve and a shell. The sensor is attached to the shaft so that the sensor detects torque exerted on the shaft. The display is electrically connected to the sensor so that the value of the torque detected by the sensor is shown on the display. The sleeve includes a tunnel through which the shaft extends. The sleeve is connected to the shaft so that they can only rotate together. The shell is rotationally provided around the sleeve. The display is connected to the shell so that the display is rotational relative to the shaft and easily observable regardless of the shaft.

4 Claims, 7 Drawing Sheets

EXTENSIVE APPARATUS FOR A WRENCH

BACKGROUND OF INVENTION

1. Field of Invention

The present invention relates to a wrench including a handle and a socket and, more particularly, to an extensive apparatus for connecting a handle to a socket of a wrench and, most particularly, to an extensive apparatus provided with a display observable from various angles.

2. Related Prior Art

Referring to FIG. 7, there is shown a conventional extensive apparatus for connecting a handle to a socket (not shown) of a wrench 9. Torque can be transmitted to the socket from the handle via the extensive apparatus. The extensive apparatus includes a shaft 91 and a display 92. The display 92 is provided on the shaft 91 so that they rotate together. When the shaft 91 is subjected to torque, the value of the torque is shown on the display 92. The observation of the display 92 is however inconvenient when it is shielded by the shaft 91. In such a case, a user has to at least disengage the shaft 91 from the socket, rotate the shaft 91 to render the display 92 observable, engage the shaft 91 with the socket again, exert torque on the wrench again, and read the value of the torque on the display 92.

The present invention is therefore intended to obviate or at least alleviate the problems encountered in prior art.

SUMMARY OF INVENTION

It is the primary objective of the present invention to provide an extensive apparatus with an easily observable display.

To achieve the foregoing objective, an extensive apparatus includes a shaft, a sensor, a display, a sleeve and a shell. The sensor is attached to the shaft so that the sensor detects torque exerted on the shaft. The display is electrically connected to the sensor so that the value of the torque detected by the sensor is shown on the display. The sleeve includes a tunnel through which the shaft extends. The sleeve is connected to the shaft so that they can only rotate together. The shell is rotationally provided around the sleeve. The display is connected to the shell so that the display is rotational relative to the shaft and easily observable regardless of the shaft.

Other objectives, advantages and features of the present invention will be apparent from the following description referring to the attached drawings.

BRIEF DESCRIPTION OF DRAWINGS

The present invention will be described via detailed illustration of the preferred embodiment referring to the attached drawings wherein.

DETAILED DESCRIPTION OF PREFERRED EMBODIMENT

Figure 1:
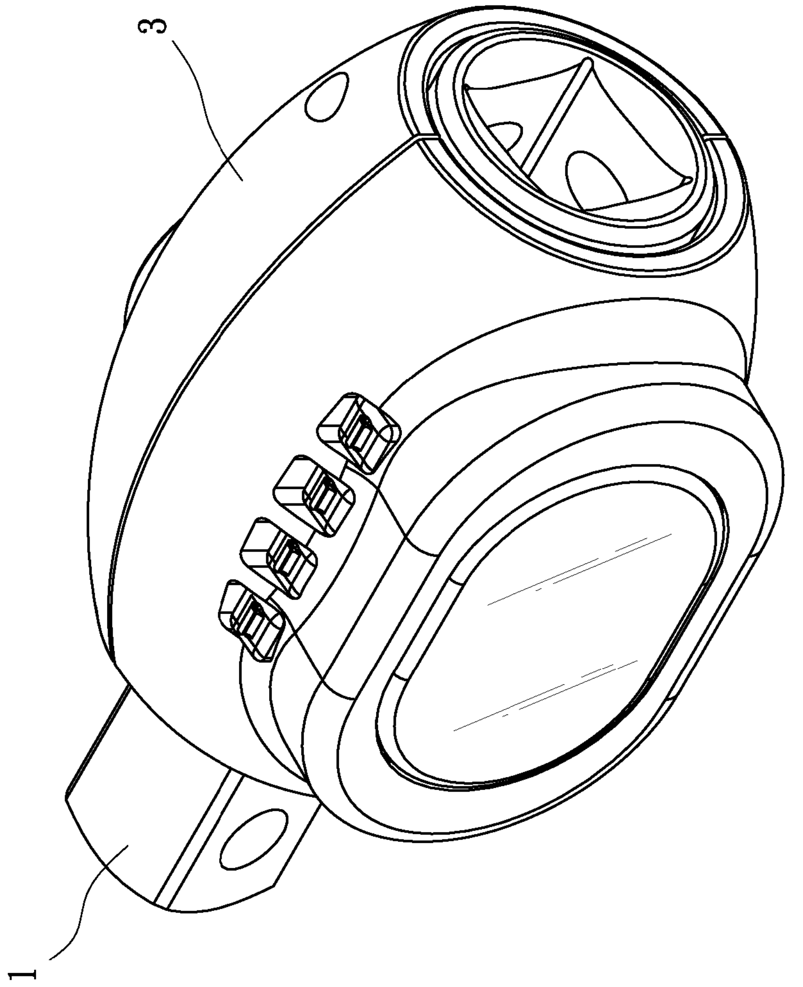
FIG. 1 is a perspective view of an extensive apparatus according to the preferred embodiment of the present invention.
Figure 2:
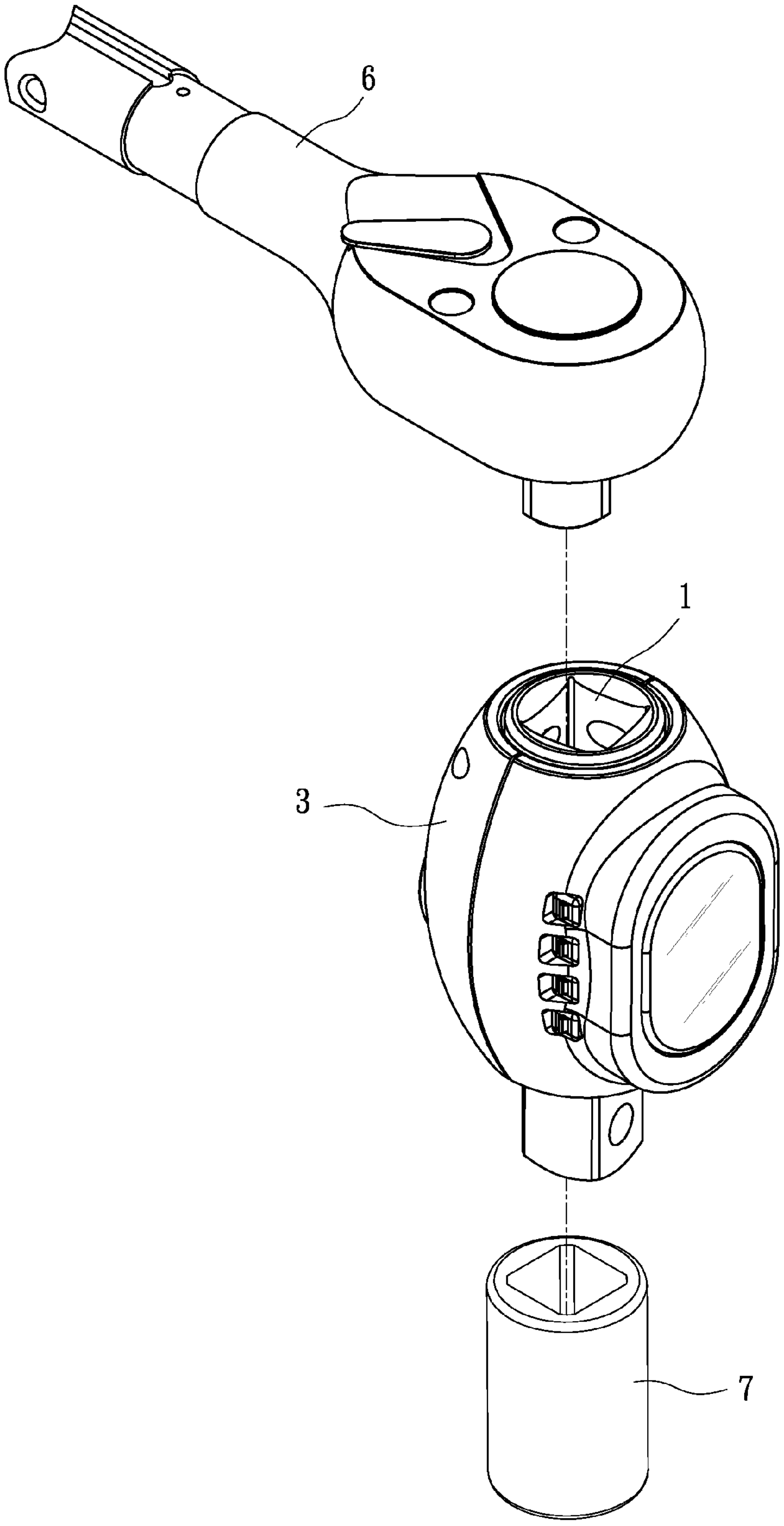
FIG. 2 is an exploded view of a wrench including a handle, a socket and the extensive apparatus shown in FIG. 1.
Figure 3:
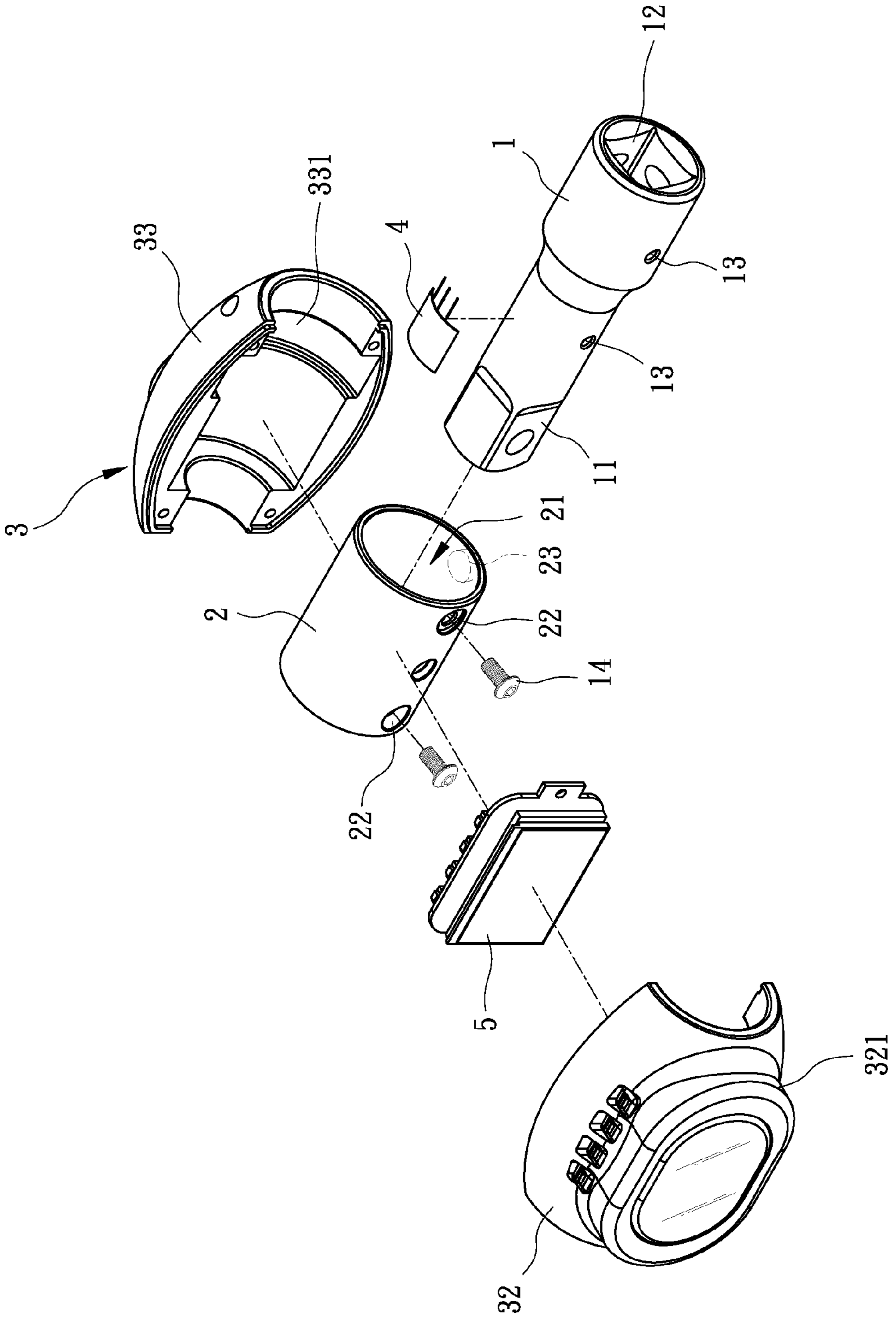
FIG. 3 is an exploded view of the extensive apparatus shown in FIG. 1.

Referring to FIGS. 1 through 3, a wrench includes a handle 6, a socket 7 and an extensive apparatus according to the preferred embodiment of the present invention. Torque is transferred to the socket 7 from the handle 6 through the extensive apparatus in operation of driving a fastener such as a screw and a nut.

The extensive apparatus includes a shaft 1, a sleeve 2, a shell 3, a sensor 4 and a display 5. The shaft 1 includes preferably a round profile when it is viewed along an axis thereof. The shaft 1 includes a first end 11, a second end 12 and two screw holes 13 defined in the periphery. The first end 11 of the shaft 1 includes preferably a square profile when it is viewed along the axis of the shaft 1. However, the first end 11 of the shaft 1 may be made a bit such as a screwdriver and a socket with a fixed size in another embodiment. The first end 11 of the shaft 1 can be fit in a preferably square cavity defined in the socket 7. Thus, the shaft 1 rotates together with the socket 7. The second end 12 of the shaft 1 includes preferably a square cavity for receiving a square insert of the handle 6. Thus, the shaft 1 rotates together with the handle 6.

The sleeve 2 includes a tunnel 21 axially defined therein, two apertures 22 transversely defined therein and a boss 23 formed on an external side. The tunnel 21 is in communication with the apertures 22. The apertures 22 are preferably countersink holes.

The shell 3 includes a first half 32 and a second half 33. The halves 32 and 33 of the shell 3 can be joined together to define a chamber 31 between them. The chamber 31 includes two open ends. The first half 32 of the shell 3 includes a window 321. The second half 33 of the shell 3 includes a groove 331 defined in an internal side. Thus, the groove 331 is in communication with the chamber 31. The groove 331 includes two closed ends.

The sensor 4 is preferably a strain gauge. The display 5 is preferably a liquid crystal display.

Figure 4:
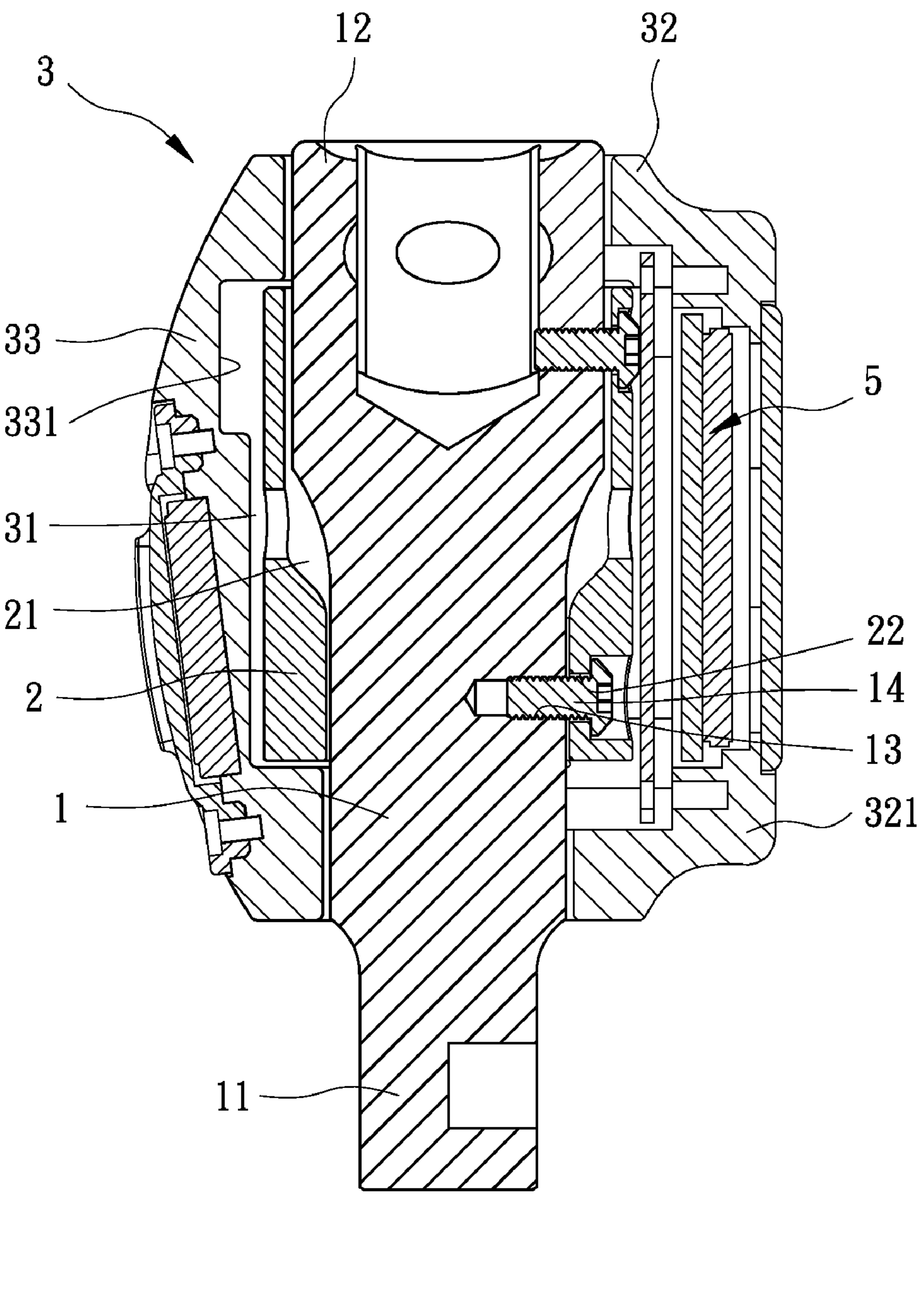
FIG. 4 is a cross-sectional view of the extensive apparatus of FIG. 1.
Figure 5:
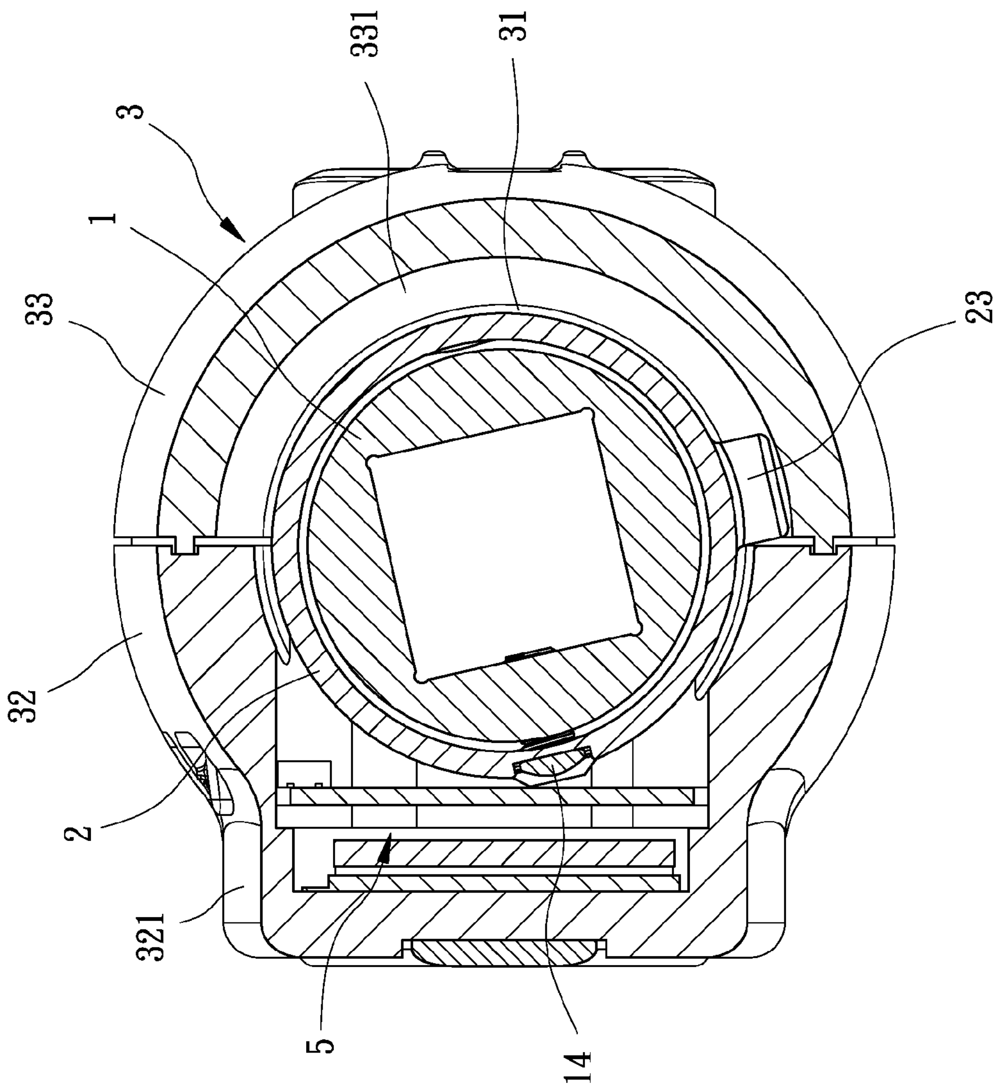
FIG. 5 is another cross-sectional view of the extensive apparatus shown in FIG. 1.
Figure 6:
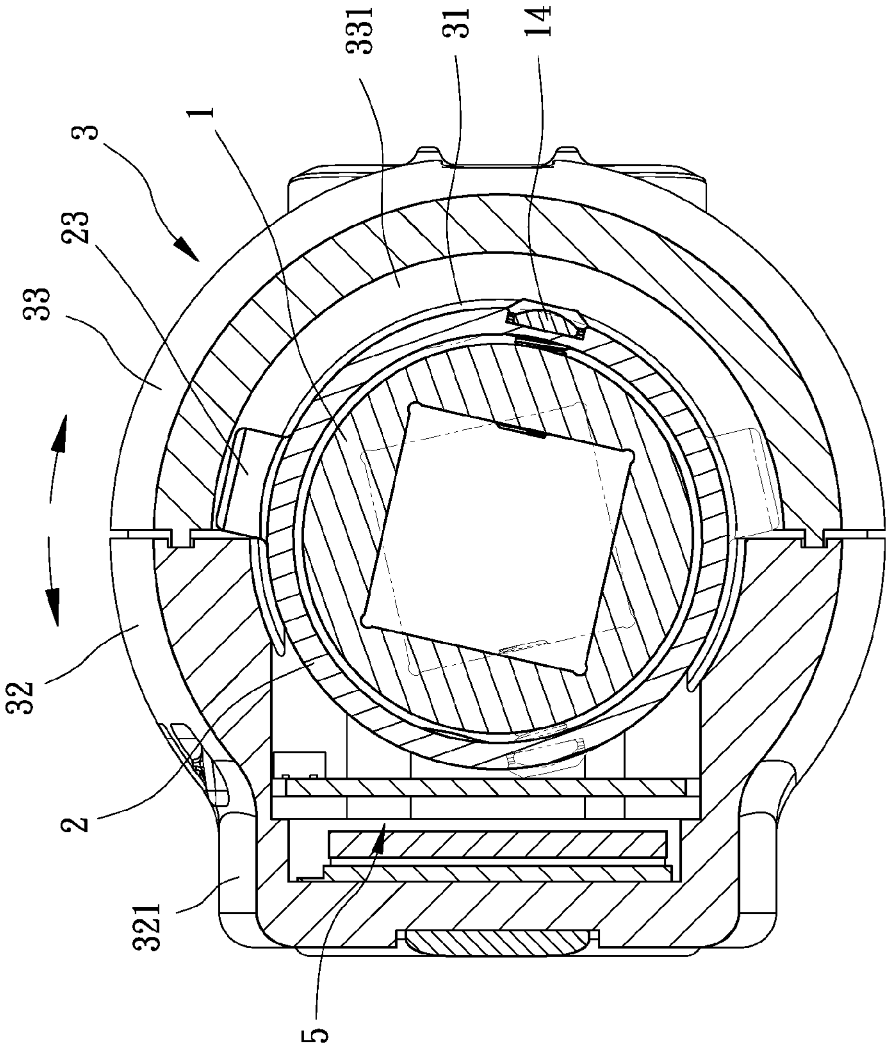
FIG. 6 is a cross-sectional view of the extensive apparatus in another position than shown in FIG. 5.
Figure 7:
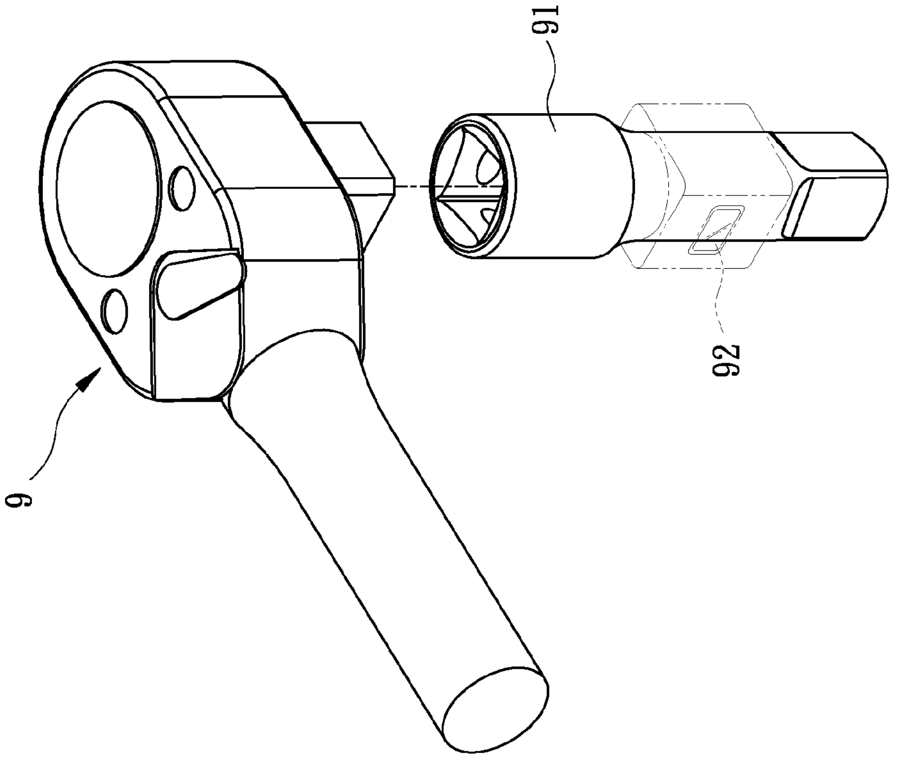
FIG. 7 PRIOR ART
FIG. 7 is a perspective view of a handle and a conventional extensive apparatus.

Referring to FIGS. 4 through 6, the sensor 4 is attached to the shaft 1. The sensor 4 senses torque exerted on the shaft 1. The sleeve 2 is provided around the shaft 1. There are provided two screws 14 each driven in a related one of the screw holes 13 through a related one of the apertures 22. Thus, the sleeve 2 is connected to the shaft 1 so that they can only rotate together. The sensor 4 may or may not be located between the shaft 1 and the sleeve 2. The display 5 is electrically connected to the sensor 4 through wires for example. The display 5 is connected to the first half 32 of the shell 3. The display 5 is observable through the window 321. The halves 32 and 33 are joined together after they are provided around the shaft 1, the sleeve 2, the sensor 4 and the display 5. The ends 11 and 12 of the shaft 1 are located outside the shell 3 so that they can be connected to the socket 7 and the handle 6, respectively.

As clearly shown in FIGS. 5 and 6, the boss 23 is movably located in the groove 331. That is, the shell 3 and the display 5 can be rotated around the sleeve 2 and the shaft 1. The movement of the boss 23 in the groove 331 is confined between the closed ends of the groove 331. That is, the rotation of the shell 3 around the sleeve 2 is limited by an angle swept by the groove 331.

Advantageously, the display 5 can be rotated around the shaft 1. Hence, the display 5 can be rotated relative to the shaft 1 so that the display 5 can be observed regardless of an angular position of the shaft 1.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An extensive apparatus for being assembled to a wrench handle, the extensive apparatus comprising:

a shaft;

a sensor attached to the shaft so that the sensor detects a value of torque exerted on the shaft;

a display electrically connected to the sensor so that the value of the torque detected by the sensor is shown on the display;

a sleeve including a tunnel through which the shaft extends, wherein the sleeve is connected to the shaft so that they can only rotate together; and a shell rotationally provided around the sleeve, wherein the display is secured on the shell so that the display is rotatable about the shaft and observable regardless of the shaft.

2. The extensive apparatus according to claim 1, wherein the sleeve includes a boss formed thereon, wherein the shell includes a groove defined in an internal side for movably receiving the boss, wherein the rotation of the display around the shaft is limited because the movement of the boss in the groove is confined between two closed ends of the groove.

3. The extensive apparatus according to claim 2, wherein the shell includes:

a first shell portion including a window defined therein, wherein the display is observable through the window; and a second shell portion in which the groove is defined.

4. The extensive apparatus according to claim 1, wherein the shaft includes a round profile when it is viewed along an axis.

* * * * *